Oct. 29, 1968
W. K. KAHN
3,408,567
RF POWER METER EMPLOYING A TRAVELLING WAVE
APPARATUS AND A MASER CAVITY
Filed Aug. 20, 1964
2 Sheets-Sheet 1
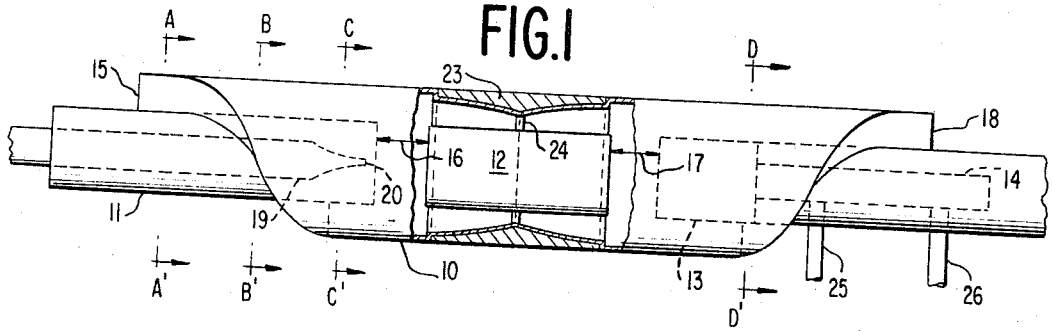
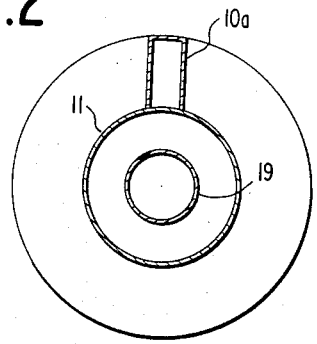
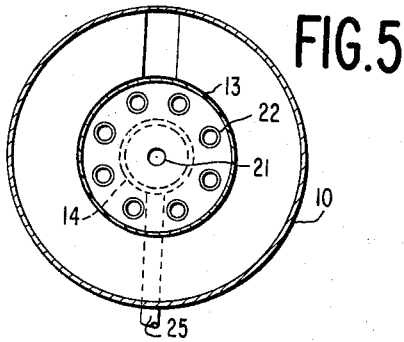
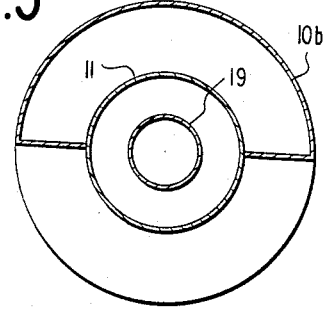
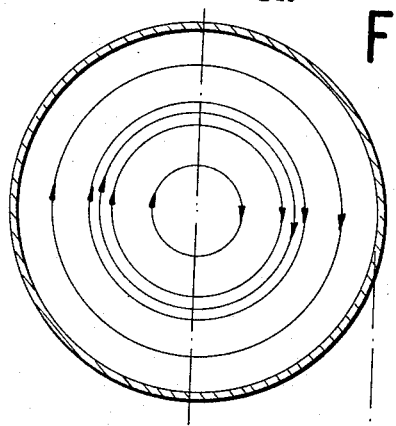
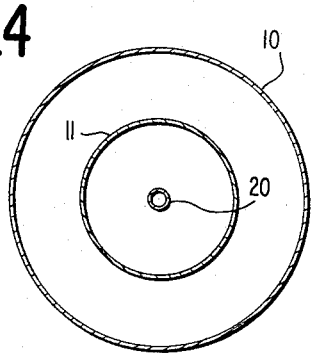
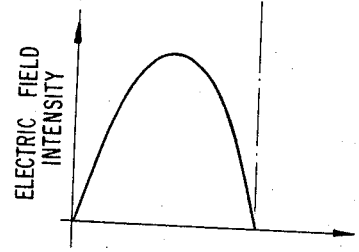
INVENTOR.
WALTER K. KAHN
BY Kenyon, Palmer, Stewart and Estabrook
ATTORNEY

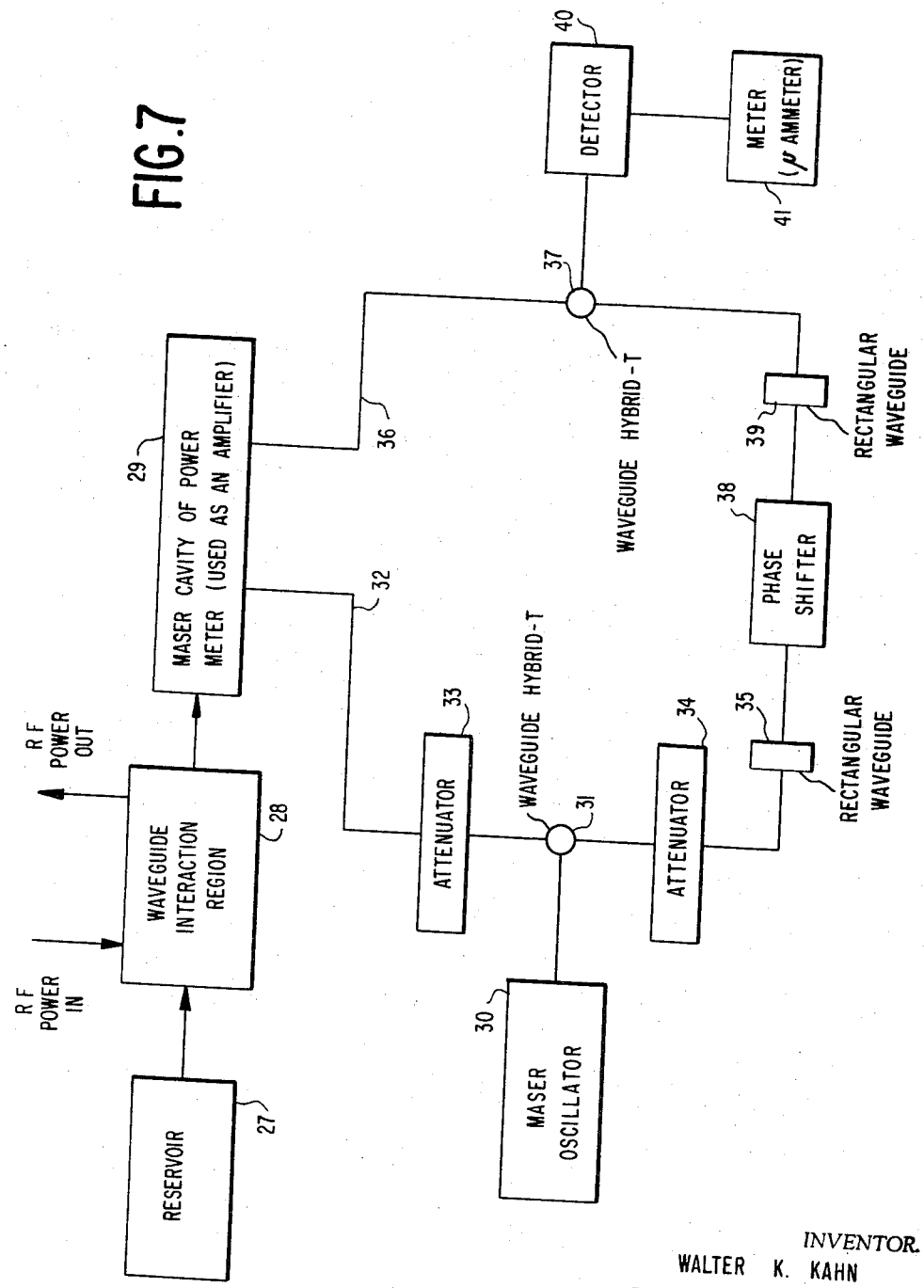

United States Patent Office 3,408,567
Patented Oct. 29, 1968

3,408,567
RF POWER METER EMPLOYING A TRAVELLING WAVE APPARATUS AND A MASER CAVITY
Walter K. Kahn, Brooklyn, N.Y., assignor to Polytechnic Institute of Brooklyn, a corporation of New York
Filed Aug. 20, 1964, Ser. No. 390,927
5 Claims. (Cl. 324—95)

ABSTRACT OF THE DISCLOSURE

A radio frequency power meter is disclosed by the hereinafter specification. According to the invention a beam of gas molecules is formed and directed through an RF field of unknown field strength in a waveguide. The field acts to focus or defocus the beam. The focused or defocused beam is received in a maser cavity where it is used to amplify a standard signal from a source of such signals. The amount of amplification achieved within the cavity is dependent upon the population state of the gas beam which state is dependent on the energy content of the RF field. The amplified signal is compared with a phase shifted signal from the standard source to produce a resultant output signal that is indicative of RF power and may be displayed. This abstract is neither intended to define the invention of the application which, of course, is to be measured by the claims nor is it intended to be limiting as to the scope of the invention in any way.

---

This invention relates to a radio frequency power meter operating in the microwave spectrum and in particular to a power meter utilizing the field effect of an RF wave on a molecular gas beam whereby the gas beam is utilized in a maser cavity in conjunction with another signal to produce an indication of power.

The prior art has utilized temperature sensitive elements of the bolometer and thermocouple type to measure microwave power. It is also common in the prior art to measure microwave power through the use of dummy loads.

The prior art devices have generally proved ineffective in their ability to measure microwave power in that bolometers, for instance, are easily burned out by overloads and thermocouples provide poor matches, thus accounting for high loses. Dummy loads generally require special connections thus causing disenabling of the equipment under test.

It is an object of this invention to provide an RF power meter that is capable of measuring high microwave power with low loss.

It is an object of this invention to provide a means to measure high microwave power energy through the interaction of a beam of gas molecules with an electromagnetic wave.

Another object of this invention is to provide and RF power meter which may be incorporated into the equipment to be tested, and which may be used during normal operation of the equipment.

A complete understanding of this invention may be had from the following detailed description taken in conjunction with the attached drawings in which:

FIGURE 1 represents a section of waveguide wherein a molecular beam is caused to interact with an RF beam;

FIGURE 2 is a view in cross section of a pair of coaxial waveguides taken along the line A–A' of FIGURE 1 where the top waveguide is shown as rectangular in cross section;

FIGURE 3 is a view in cross section of a pair of coaxial waveguides taken along the line B–B' of FIGURE 1 where the outer waveguide is shown as a semicircle in cross section;

FIGURE 4 is a view in cross section of a pair of coaxial waveguides taken along the line C–C' of FIGURE 1 where the outer waveguide is shown as circular in cross section;

FIGURE 5 is a view in cross section of a pair of coaxial waveguides taken along the line D–D of FIGURE 1 where the outer waveguide is shown as a circular to rectangular transducer and the entrance to the maser cavity is shown;

FIGURE 6 is a diagram showing the $H_{01}$ mode;

FIGURE 7 is a block diagram of one embodiment of the invention.

In general, the objects of the invention are obtained by causing the beam of gas molecules to interact with an electromagnetic wave. The interaction of a traveling wave with a gas beam will cause the molecules in the beam to be selectively focused, or defocused, or the output beam will be selectively populated. The selectively populated beam is then intercepted by a maser cavity where the maser acts as an amplifier for a signal supplied from a source of standard signals. The amount of amplification is directly dependent upon the effect of the interaction of the traveling wave with a molecular gas beam.

In the prefered embodiment of this invention, the amplified signal from the maser cavity is combined with a phase shifted signal supplied from the standard source of signals. The amount of phase shifting is set so that in the absence of amplification in the maser cavity, the two signals will tend to cancel out thus giving a zero indication on a register. Thus, when the signal is being amplified, the two signals in combination will produce an unbalanced signal that will give a direct reading of the RF content in the traveling wave.

It has been the practice in maser technology to use a static electrical field having an intensity E to act upon a beam of gas molecules. The gas molecules commonly are of the ammonia type. The molecules experience a force that depends on the magnitude of the field. It has been the practice to focus or defocus the beam of gas molecules through the use of an electrostatic field. This principle is well known and needs no further explanation. The force experienced by the ammonia type molecules in a gas beam in the field is given by (1)
$$F = \mp \text{grad}\left\{\left(\frac{h\nu_0}{2}\right)^2 + \left(\frac{M_J K}{J(J+1)}\mu|E|^2\right)^2\right\}^{1/2}$$

where $\nu_0$ is the zero field inversion frequency, J, K, and $M_J$ are quantum numbers specifying the rotational state of the molecule relative to the direction of the field, and $\mu$ is the molecular dipole element.

Since the force experienced by the molecules in the beam does not depend on the sign of the field, then for harmonic electric fields the RMS value $$\frac{1}{\sqrt{2}}E \text{ max}$$

may be employed in 1 as a first rough approximation.

This means that a gas beam of molecules may be subjected to the influence of a harmonic field to produce the focusing, defocusing or selective populating effect produced by static field techniques in certain conventional masers.

Furthermore, the use of a harmonic field permits utilization of the desirable $H_{01}$ mode pattern in circular waveguides, and this mode pattern cannot be achieved with a static field.

This principle was utilized in the present device in that since an RF field may be used to focus or defocus a molecular beam then by using the focused or defocused beam in a maser amplifier the amount of amplification obtainable is in proportion to the quantity of focusing or defocusing and thus usable as a measure of RF power.

Referring now to FIGURE 1, the elements essential to the interaction area of this invention are shown as an elongated waveguide 10 having concentric coaxial waveguide sections 11, 12 and 13 contained within the waveguide 10 and a maser cavity 14 contained within the waveguide section 13.

The waveguide 10 provides a means by which an RF wave may be introduced into the coaxial waveguides and withdrawn from them.

In one embodiment of this invention, the elongated waveguide 10 is rectangular in cross section at both extreme ends of the waveguide and cylindrical in cross section throughout the middle portion of the waveguide. The waveguide 10 constitutes a rectangular to circular waveguide transducer at its left end and a circular to rectangular waveguide transducer at its right end.

The transition from a rectangular waveguide to a circular waveguide is given in FIGURES 2, 3, and 4. In FIGURE 2, the rectangular portion 10a of the waveguide 10 is shown as a cross sectional view taken along the line A–A' of FIGURE 1. In FIGURE 3 the semicircular portion 10b of the waveguide 10 is shown as a cross sectional view taken along the line B–B' of FIGURE 1. In FIGURE 4 the full mechanical transition to a circular structure 10 is shown as a cross sectional view taken along the line C–C' of FIGURE 1. When the gap in the concentric circular waveguide 11 and 12 is designed in conformity with well known directional coupler art, power is conducted through the gap from the left outer coaxial region into the right inner circular waveguide region. Thus, the circular waveguide 10 in one embodiment of this invention constitutes a square $TE_{10}$ electric rectangular to $TE_{01}$ round transducer on the left and a circular electrical $TE_{01}$ round to $TE_{10}$ rectangular transducer on the right. Thus, the field configuration in the rectangular guide on the left is forced into the desired configuration in the cylindrical guide in the center by shaping the walls from the rectangular cross sectional configuration to the cylindrical cross sectional configuration with the reverse process being followed on the right-hand side of the elongated waveguide 10.

The cylindrical waveguide sections 11, 12, and 13 are contained within and coaxial with the elongated waveguide 10 and are so designed in diameter and so placed within the waveguide 10 that substantially all of the RF power entering the waveguide 10 at the entrance 15 will be transferred through the coaxial waveguide 10 of outer diameter $D_2$ into the cylindrical waveguide 12 of diameter $D_1$.

In the preferred embodiment of this invention, the traveling wave will set up an $H_{01}$ mode pattern within the circular waveguide. The diameters $D_1$ and $D_2$ are in the ratio (2) $$\frac{D_1}{D_2} = \frac{X_{01}'}{X_{02}'} \simeq \frac{3.832}{7.016}$$

where $X'_{0N}$ is nth positive root of the first order Bessel function, i.e. the nth root of:

(3) $$J_1(X') = 0$$

The distance L is chosen so that the traveling wave entering at 15 will be transferred to the concentric coaxial waveguide section 12 through the distance 16 separating the concentric coaxial waveguide section 11 from section 12. The required L is approximately given by:

(4) $$L \simeq \left|\frac{\pi}{B_2 - B_1}\right|$$

where $B_2$ is equal to the propagation constant of the $TE_{02}$ mode ($H_{02}$ mode) in the circular waveguide of diameter $D_2$ and $B_1$ is equal to the propagation constant of the $TE_{01}$ mode ($H_{01}$ mode) in the circular waveguide of diameter $D_2$.

Through the same choice of constants, the traveling wave will exit from the waveguide section 12 in the distance 17 separating the waveguide sections 12 and 13. The RF wave will then exit from the elongated waveguide through the rectangular exit 18.

In the preferred embodiment of the invention, RF power was caused to enter the elongated waveguide 10 through microwave permeable windows into 15. In a like manner RF power was caused to exit from 18. Thus, the interaction region of the RF power meter can be connected into existing operating equipment for the purpose of obtaining a power measurement while the operating equipment is in use.

The pattern associated with $H_{01}$ mode as shown in FIGURE 5 is not possible with static fields and thus can only be produced with the RF field as used in the present invention. The electric field intensity of the $H_{01}$ mode is zero along the center axis and increases radially to a maximum at some point between the center of the waveguide and the outer wall of the waveguide. The field at the outer wall is again zero. This mode pattern constitutes an ideal pattern for causing the selective population, or population inversion of the molecular gas beam as the gas beam is forced to travel through the mode pattern. The effect of such a pattern on a beam of gas molecules having two of its energy states, an upper energy state and a lower energy state, such as to cause those molecules existing in the upper energy state to move towards regions of low field intensity. Molecules existing in the lower energy state will tend to move towards regions of greater field intensity, cf. Equation 1. With respect to the $H_{01}$ mode pattern, this means that the upper energy state molecules will move towards the center of the pattern whereas molecules existing in or having energy states of the lower level will tend to move away from the center of the pattern out to the areas of greatest field intensity. Obviously, the more energy which exists in a traveling wave, the greater the intensity of the field lines of the pattern. Thus, if a beam of gas molecules is subjected to a traveling wave having the $H_{01}$ mode pattern, then the molecules of the upper state will exist at the center of the beam and molecules of the lower state will tend to move away from the beam, the amount of molecules or number of molecules moving away from the beam being dependent upon the intensity of the field which in turn is dependent upon the power content of the traveling wave.

In the preferred embodiment of the invention, a beam of ammonia molecules is formed in the nozzle 19 contained concentrically and coaxially within the waveguide section 11. The beam of molecules may be supplied from any conventional source of such molecules. In the preferred embodiment the source is a gas reservoir containing ammonia under pressure. The nozzle 19 may be of any cross sectional configuration, for example, it may have a ribbon configuration, however, in the preferred embodiment of the invention, the nozzle is cylindrical in shape and thus the beam of gas molecules exiting at 20 into the waveguide of 11 will also be cylindrical in shape.

The beam of gas molecules interacts with an RF wave in the waveguide section 12, thus causing the beam to be focused or defocused and causing the depopulation of lower energy state molecules from the beam, the quality of focusing being dependent on the energy in the RF field.

The now selectively focused beam of gas molecules impinges on the entrance aperture 21, FIGURE 6, of the maser cavity 14. The defocused molecules, generally consisting of those molecules of the lower state which have been separated out from the beam but are still contained within the waveguide, will enter the waveguide 13 and are collected at the apertures 22, FIGURE 6, surrounding the maser cavity 14. These latter molecules then may be pumped out of the waveguide 13 by any suitable pumping means.

It was found that not all of the RF power enters the waveguide section 12 and that a very small amount including that existing in other modes is caused to travel in the waveguide 10. This residue of power may be absorbed by techniques well known in the art. In the preferred embodiment of the invention, a lossy powered iron sleeve 23 supported by the radially extending fingers 24 carried on the waveguide section 12 is used to absorb residue power. The lossy powered iron sleeve may be permeated by small pipes carrying coolant for the purpose of dissipating heat generated in the material as a result of the absorption of RF energy.

The maser cavity 14 is shown having a pair of waveguides 25 and 26 communicating with the cavity. The waveguide section 25 is used for the purpose of transmitting a standard frequency signal to the maser cavity. The standard signal is amplified by the molecular gas beam existing in the maser cavity. The amplified signal is removed through the waveguide section 26. It will be obvious to those skilled in the art that the amount of amplification possible in the maser cavity will be directly dependent upon the population state of the molecules existing in the maser cavity.

Referring now to FIGURE 7, a schematic block diagram of the RF power meter, a source of gas molecules 27 supplies the beam of molecules to the interaction region 28. The molecular beam of gas molecules interacts with an RF wave, the power inherent in which is to be measured and supplied from a suitable source of such waves. The focused molecular beam is intercepted by a maser cavity 29 where the maser is used as an amplifier.

A source of signals 30, shown in the preferred embodiment of this invention as a maser oscillator in that a maser oscillator is a convenient and standard source of electromagnetic waves of suitable frequency, supplies a signal to the waveguide hybrid-T 31. The hybrid-T 31 will cause the signals supplied from the maser oscillator to be split along the signal paths 32 and 35. That portion of the signal traveling along the waveguide path 32 is passed through an attenuator 33 and then into the maser cavity 29. The amplified signal is removed from the maser cavity by a waveguide 36, which waveguide 36 communicates with a waveguide hybrid-T 37.

The split signal from the waveguide hybrid-T 31 is also caused to pass through an attenuator 34 along the waveguide section 35 to a phase shifter 38. Thus, the signal propagated along the waveguide 35 is phase shifted with respect to the signal transmitted along the waveguide path 32. The phase shifted signal is then transmitted to the waveguide hybrid-T 37 by a section of waveguide 39.

The attenuators 33 and 34 and a phase shifter 38 may take any of several common forms as used in the waveguide art. For instance, the phase shifter 38 could be a pinched section of waveguide.

The frequency of the maser oscillator 30 and the center frequency of the maser cavity 29 are substantially the same and are brought to coincidence by adjusting the maser oscillator and/or the maser cavity 29.

The two signals, the amplified signal carried by the path 36 and the phase shifted unamplified signal transmitted by the path 39 and received by the waveguide hybrid-T 37 are received in a conventional detector 40. The attenuators 34 and 33 and the phase shifter 38 are set so that in the absence of an RF field in the interaction region 28, the two signals are in such relationship with each other that they will cancel each other out in the detector 40 and are absorbed by the load inherent in the waveguide hybrid-T 37. In the event that the signal on path 36 and the signal on path 39 are unbalanced, the detector 40 will then detect the degree of unbalance. The actual amount of difference will be directly dependent upon the intensity of the $H_{01}$ mode pattern heretofore discussed with reference to FIGURE 1, which in turn depends entirely on the power content of the RF field. Thus, the degree of unbalancing is registered as a current on microammeter 41 and will give a direct reading of the power content of the traveling wave.

What is claimed is:
1. A device for detecting and indicating the RF power in a traveling wave comprising: means for forming a beam of gas molecules; means for combining said beam of gas molecules with a traveling wave containing RF energy such that said beam and said traveling wave interact; to focus molecules from said beam, the amount of focusing being dependent on the RF energy content of said traveling wave means operatively associated with said combining means for detecting the amount of focusing achieved by said combining means and for producing an output signal dependent on said amount of focusing; and means responsive to said output signal for indicating the RF energy content of said traveling wave.

2. A device for detecting and indicating the RF power in a traveling wave comprising in combination: means for supplying a beam of gas molecules to an elongated waveguide; means for admitting a traveling wave to said waveguide; means to cause said traveling wave to interact with said beam of gas molecules; cavity means for receiving the resultant beam of gas molecules; a source of standard frequency signals; means for supplying a first signal from said source of standard frequency signals to said cavity means; means for removing the resultant signal from said cavity means; means for applying said resultant signal to a detector; means for supplying a second signal from said source of standard frequency signals to said detector; and means for indicating any unbalancing between the two signals supplied to said detector as an indication of said RF power.

3. A device for detecting and indicating the RF power in a traveling wave comprising in combination: means for supplying a beam of gas molecules having energy states, the energy states associated with which molecules is dependent on the intensity of electromagnetic fields in such manner that the spatial dependence of the fields acts to separate molecules in one class of energy states from those molecules in a second class of energy states, to an elongated waveguide; means for admitting an RF wave to said waveguide; means to cause said RF wave to interact with said beam of gas molecules so that the molecules in one of said energy states will be subtracted from the beam, the number of molecules subtracted being dependent on the RF power in said traveling wave; means for removing gas molecules subtracted from said beam; means for receiving the gas beam containing molecules in both energy states; means for supplying a first standard signal to said receiving means so that said standard signal may be amplified in said receiving means; means for removing an output signal from said receiving means and supplying said output signal to a detector; means for applying a second standard signal to said detector; and indicating means for displaying the resultant output from said detector as an indication of said RF power.

4. A device for detecting and indicating the RF power in a traveling wave comprising in combination: a means for supplying a beam of $NH_3$ molecules to an elongated waveguide; means for supplying RF waves to said elongated waveguide; three coaxial waveguide sections contained within said elongated waveguide in such a manner that said beam of $NH_3$ molecules passes along the axis of said coaxial waveguide sections, the distance between the first and second and the second and third of said waveguide sections being such that substantially all of the RF waves pass through the second section in an $H_{01}$ mode, so that said beam of $NH_3$ molecules will be selectively focused by said RF waves; means for removing the defocused molecules from said waveguides; means to remove the RF wave from said waveguides; a maser cavity connected to receive the focused beam of said $NH_3$ molecules; a maser oscillator as a source of standard signals; a first hybrid-T in the output of said maser oscillator for splitting the signals from said maser oscillator into two components; an attenuator and waveguide for transmitting one of said signals to said maser cavity so that said signals so conveyed may be amplified by the focused beam of $NH_3$ molecules in said maser cavity; waveguide means connected to said cavity to transmit the amplified signal from said maser cavity to a second hybrid-T; an attenuator and waveguide connected to said first hybrid-T for transmitting the other of said signals from said maser oscillator to a phase shifting means; a waveguide for transmitting the phase shifted signal from said phase shifting means to said second hybrid-T; means connected to said second hybrid-T for combining said phase shifted signal from said phase shifter and said amplified signal from said maser cavity to detect any unbalance between said phase shifted signal and said amplified signal; and means connected to said combining and detecting means to indicate said unbalance between said phase shifted signal and said amplified signal where the quantity of unbalancing gives a direct indication of the RF power content of said RF waves.

5. A method of measuring microwave power comprising the steps of: admitting to an elongated waveguide a beam of gas molecules in each of two types of energy states; simultaneouly admitting to said elongated waveguide a radio wave to interact with said beam of gas molecules so that the number of molecules in one state in said gas beam will be reduced relative to the number of molecules in the other state in said gas beam; admitting the resultant beam into a maser cavity; applying a signal from a standard frequency source simultaneously to said maser cavity and to a phase shifting network so that the signal will react with the molecular beam in said maser cavity, comparing said phase shifted signal with the output signal from said maser cavity; and detecting and displaying the resultant signal as an indication of the RF power of the radio wave admitted to said elongated waveguide.

References Cited

UNITED STATES PATENTS

| | | | |
|---|---|---|---|
| 2,707,235 | 4/1955 | Townes | 330—4 |
| 2,995,711 | 8/1961 | Peter | 330—4 |
| 3,243,700 | 3/1966 | McAvoy | 324—58 |

RUDOLPH V. ROLINEC, *Primary Examiner.*

E. F. KARLSEN, *Assistant Examiner.*